No. 765,292.

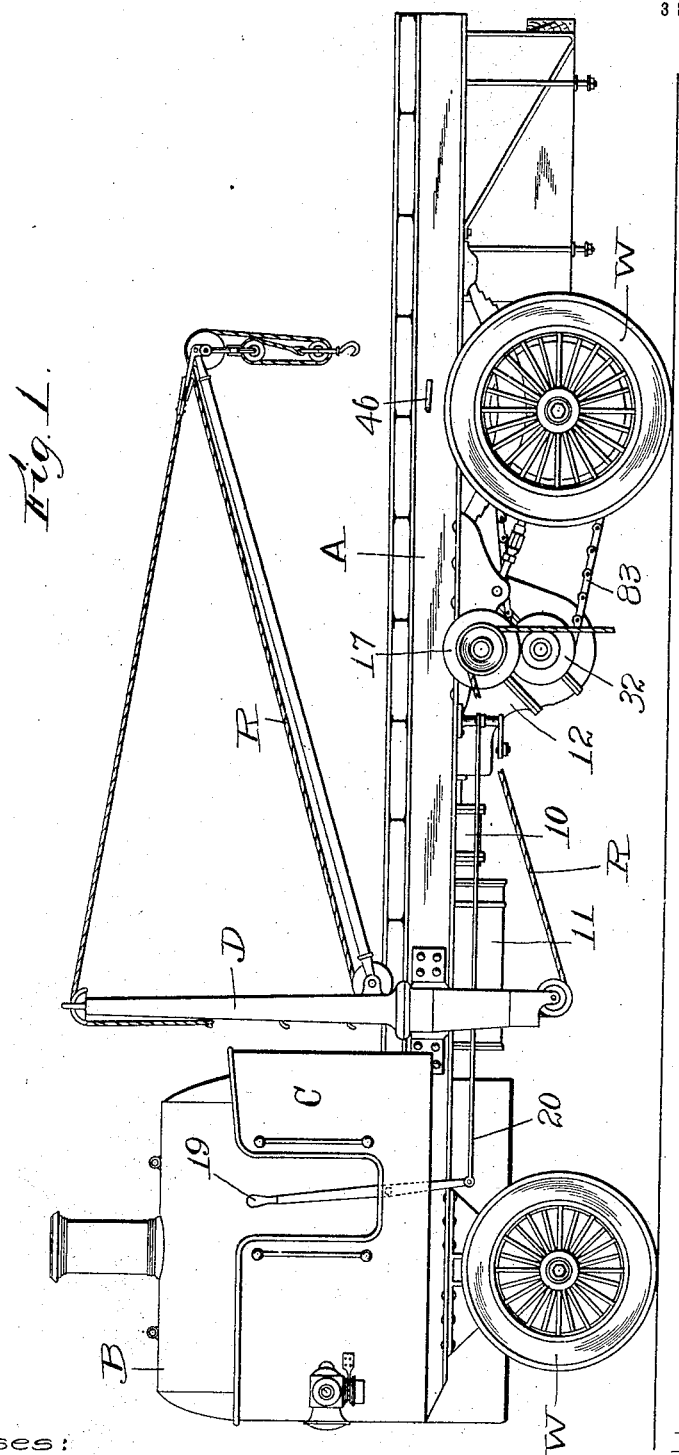

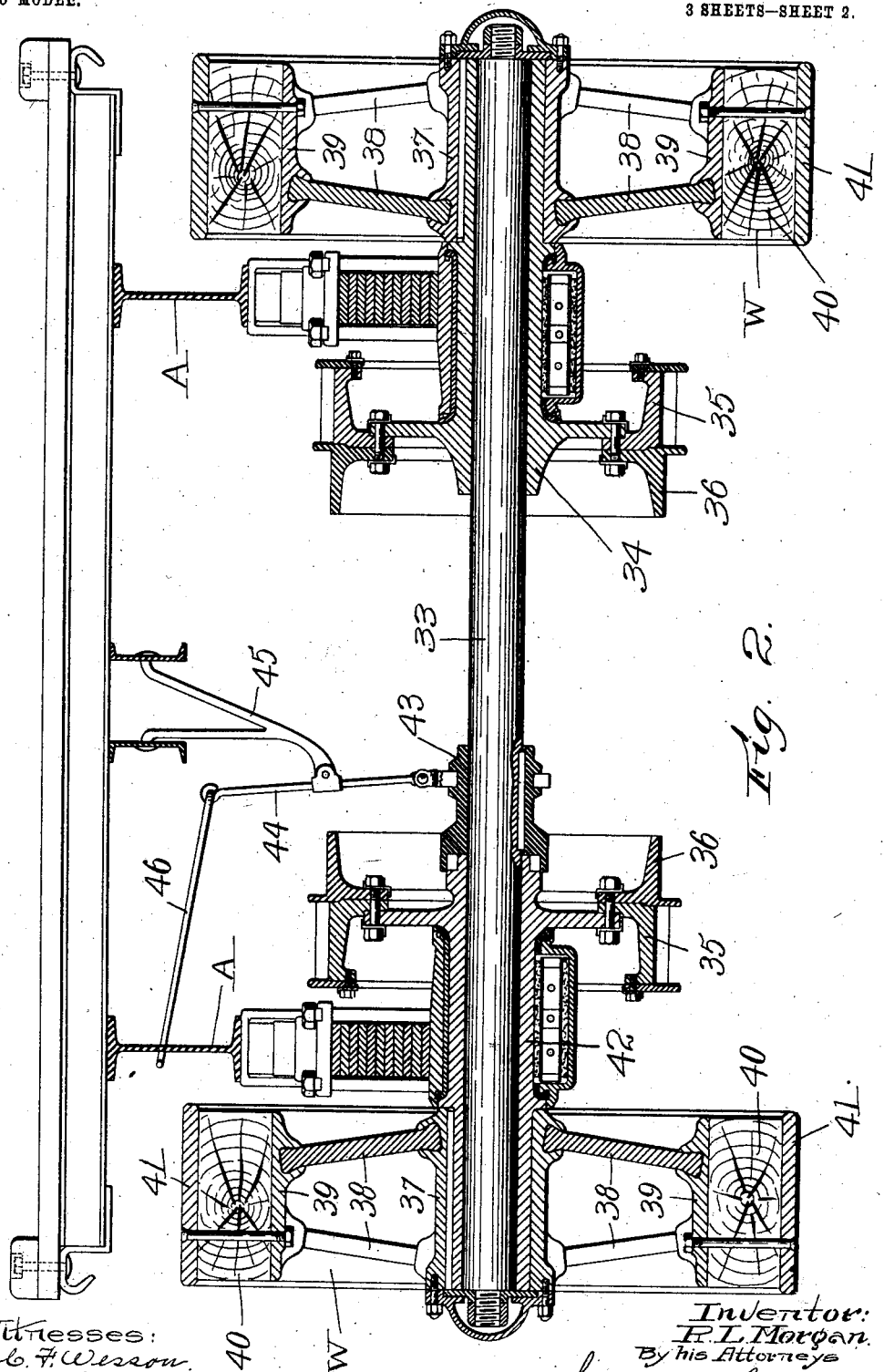

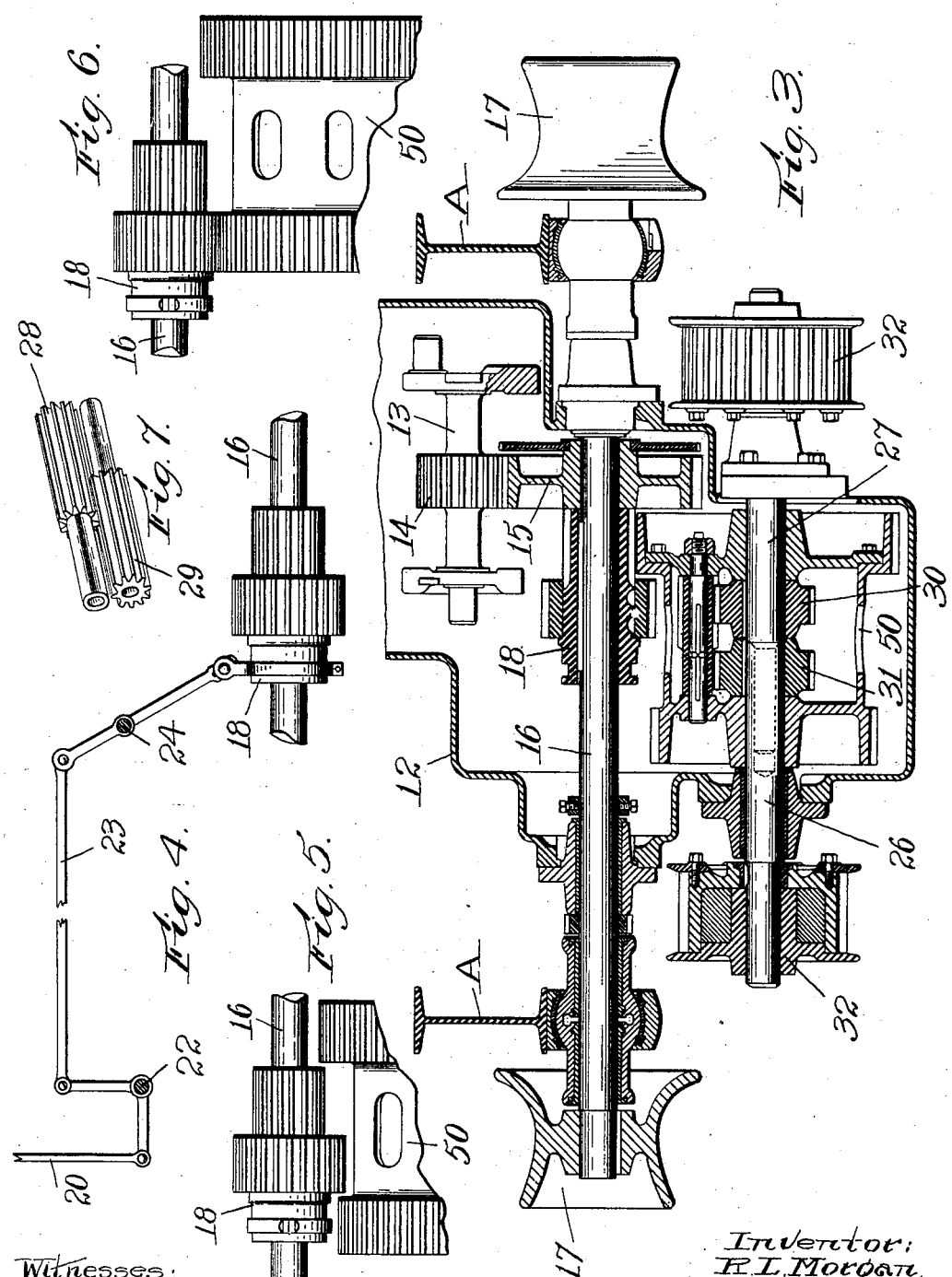

Patented July 19, 1904.

UNITED STATES PATENT OFFICE.

RALPH L. MORGAN, OF WORCESTER, MASSACHUSETTS.

DRIVING CONNECTION FOR MOTOR-TRUCKS.

SPECIFICATION forming part of Letters Patent No. 765,292, dated July 19, 1904.

Application filed November 14, 1902. Serial No. 131,316. (No model.)

*To all whom it may concern:*

Be it known that I, RALPH L. MORGAN, a citizen of the United States, residing at Worcester, in the county of Worcester and State of Massachusetts, have invented a new and useful Driving Connection for Motor-Trucks, of which the following is a specification.

This invention relates to that class of motor-trucks which are designed for carrying heavy loads over the ordinary streets or highways.

The especial object of this invention is to provide a motor-truck of this class with a power-transmitting train comprising simple and efficient change-speed connections whereby the truck may be run at different relative speeds and by means of which the truck-motor may be disconnected from the running-gear of the truck, so that the same may be used for loading or unloading the truck or for other purposes besides that of locomotion, to provide for transmitting power to the truck-wheels through a compensating gearing which will permit one of the driven wheels to turn independently of the other, and to provide for coupling the driven wheels together when such connection is desired for running over slippery or uneven pavements or for other purposes.

To these ends this invention consists of the power-transmitting connections for a motor-truck and of the combinations of parts therein, as hereinafter described, and more particularly pointed out in the claims at the end of this specification.

In the accompanying three sheets of drawings, Figure 1 is a side view of a motor-truck constructed according to this invention. Fig. 2 is an enlarged transverse sectional view through the rear axle. Fig. 3 is a rear view, partially in section, showing the connections from the engine crank-shaft to the driving sprocket-wheels. Fig. 4 is a fragmentary plan view showing the connections for shifting the driving-pinion. Fig. 5 is a fragmentary view showing the driving-pinion in its uncoupled position. Fig. 6 is a fragmentary view showing the driving-pinion thrown to its low-speed position, and Fig. 7 is a perspective view of one pair of the compensating pinions.

A motor-truck constructed according to this invention as herein illustrated is provided with one or more capstan-heads, which are connected to be turned by the engine or other motor of the truck. These capstan-heads are preferably connected to turn at all times while the engine or other motor is running. In order to permit these capstan-heads to be used while the truck is standing still, I have provided a simple and efficient form of change-speed gearing. When this change-speed gearing is in one position the engine is connected to drive the truck at slow speed, when in another position, the engine will be connected to drive the truck at a higher speed, and when in a third position (preferably an intermediate position) the motor will be disconnected from the running-gear of the truck, so that the capstans may be employed for other purposes—such, for example, as operating a crane or derrick to load or unload the truck, for lifting the truck by its own power from holes or over obstructions, or for other purposes for which the application of power is desirable.

The driving connections also preferably comprise a compensating gearing which will permit one of the driven wheels to turn more rapidly than the other to allow the truck to turn without causing unnecessary strains and also comprise a connection for locking the driven wheels, so that they will turn together without the transmission of power or strains through the compensating gear. This coupling connection for directly connecting the driven wheels together without regard to the compensating gearing I regard as an especially important feature of my invention, as it enables me to take the strain off of the compensating gearing in special emergencies. For example, when running over very slippery pavements one wheel will sometimes commence to slip or "race," while the other wheel will not turn at all. In an emergency of this kind by locking the power-driven wheels together the strain will be taken off the compensating gearing and the truck can be successfully run over difficult or slippery pieces of road, after which the locking connections may be unfastened, permitting the compensating gearing to act for ordinary purposes.

Referring to the accompanying drawings for a detail description of one form of motor-truck embodying my invention, as illustrated in Fig. 1, A designates the platform or frame of a motor-truck. This frame or platform preferably comprises longitudinal I-beams supporting smaller transverse I-beams carrying the truck-flooring. At the forward end of the platform A is the engineer's cab or compartment C, containing the usual boiler B. The truck-platform A is supported through suitable springs on the truck-wheels W. The engine and running-gear for the motor-truck are preferably located below the platform A. As shown in Fig. 1, the engine comprises high-pressure cylinders 10 and low-pressure cylinders 11, each high-pressure cylinder being located in line with a low-pressure cylinder 11, as in ordinary tandem compound engines. The engine crank-shaft and the gearing driven therefrom are inclosed in a gear-casing 12. As shown most clearly in Fig. 3, the engine crank-shaft 13 is provided with a pinion 14, which meshes with and drives a gear 15, secured upon the capstan-shaft 16. The capstan-shaft 16 is journaled in boxes which are supported in ball-and-socket joints from the side I-beams of the truck-frame A. At each end the capstan-shaft 16 is provided with a capstan-head 17.

Keyed onto and longitudinally movable on the capstan-shaft 16 is a driving-pinion 18. The driving-pinion 18 may be shifted to different positions to throw in the high or low gear or to uncouple the driving connections, so that the capstans can be used when the truck is stationary. The connections for shifting the driving-pinion are preferably controlled from the cab or engineer's compartment. As shown most clearly in Fig. 1, a lever 19 is pivoted at the side of the boiler and is connected at its lower end to a link 20. As shown most clearly in Fig. 4, the link 20 is connected to an arm extending from a vertical rock-shaft 22. A second arm extending from the vertical rock-shaft is connected by a link 23 to a vertical rock-shaft 24, and extending from the vertical rock-shaft 24 is an arm connected to a split ring for shifting the driving-pinion 18. When the driving-pinion 18 is in the position illustrated in Fig. 3, it will throw in the low-speed gear to drive the truck at its slow speed. When the driving-pinion 18 is in a central position, as illustrated in Fig. 5, it will be out of gear, so that the engine may be utilized to furnish power for the capstans 17 while the truck is stationary, and when in the position illustrated in Fig. 6 the driving-pinion 18 will throw in the high-speed connection for running the truck at a higher speed.

The capstan-heads 17 may be utilized for any ordinary or hoisting purpose. As shown most clearly in Fig. 1, the truck is preferably provided with one or more cranes or derricks D, and the hoisting-rope R of the derrick D may be carried around a capstan-head 17, so that the power of the engine may be used for loading or unloading the truck. These power-driven capstans 17 will also furnish means for extricating the truck from situations where its ordinary driving connections would not be sufficiently powerful. For example, if a truck constructed according to this invention should become stuck in the mud so firmly that its ordinary driving connections would not be powerful enough to move the same then by carrying a rope or connection from one of the capstan-heads to a tree, post, or other fixed point a means will be provided for pulling the truck out of the mire.

The compensating gearing, which is operated from the driving-pinion 18, may be of any ordinary or approved construction. As illustrated in Figs. 3 and 7, a double gear or spool-shaped shell 50 is journaled loosely upon the telescopically-connected shafts 26 and 27. Journaled loosely on studs inside the spool-shaped shell 50 are a number of pairs of transmitting-pinions. Fig. 7 illustrates one pair of these transmitting-pinions 28 and 29. As shown in this figure, the pinions 28 and 29 are provided with toothed sections, which extend past and mesh into each other. One of the pinions, as 28, meshes with the gear 30, secured on the shaft-section 27, while the other pinion, 29, meshes with the gear 31, secured on the shaft-section 26. On the ends of the shaft-sections 26 and 27 are driving-sprockets 32. As herein illustrated, the driving-sprockets 32 have comparatively wide driving-faces, and, as illustrated in Fig. 1, each of the driving-sprockets 32 carries a driving-chain 83, which is connected to drive a rear wheel by means of the construction illustrated most clearly in Fig. 2.

As shown in Fig. 2, 33 designates the rear axle. Cast upon or otherwise fastened rigidly to the rear axle 33 is a sleeve 34. Bolted to a flange on the sleeve 34 is a driven sprocket 35 and brake-disk 36. Fastened on the outer end of the sleeve 34 is one of the driven wheels W. As herein illustrated, each of these truck-wheels comprises a center part consisting of spokes 38, with a rim 39 and hub 37 cast around the ends of the same. Inclosing the center part of each of the truck-wheels W is a wooden felly 40, which is inclosed by a steel tire 41. This form of wheel I have found in practice provides a strong durable construction. These wheels, however, form no part of the invention which is claimed herein. At its other end the rear axle 33 has a sleeve 42 journaled loosely thereon. The sleeve 42 carries a driven sprocket, brake-disk, and wheel, which are of the same construction as the parts carried by the sleeve 34. The sleeves 42 and 34 may be journaled in any of the ordinary bolsters or boxes which support the truck through heavy springs in any ordinary or usual manner.

Keyed onto the rear axle 33, so as to be movable thereon, is a locking-clutch 43, having clutch-teeth at its end for engaging corresponding clutch-teeth in the end of the sleeve 42. The clutch 43 may be operated by any desired form of connections. As herein illustrated, the clutch 43 is provided with a collar connected to a lever 44, pivoted in a bracket 45, extending down from the body of the truck. The lever 44 is connected at its upper end to an operating-rod 46, having a handle which may be operated from the side of the truck. By means of this construction when the clutch 43 is unlocked or disconnected from the sleeve 42 the power for turning the wheels will be transmitted through the compensating gearing, so that the wheels may turn at different speeds to permit the truck to be run around corners or upon curves without unduly straining the parts. On special occasions—for example, when running on slippery pavements—the clutch-sleeve 43 may be thrown in to provide a direct connection between the driven wheels of the vehicle, so that they will turn in unison and avoid all possibility of a slipping or racing of either of said wheels.

I am aware that numerous changes may be made in practicing my invention by those who are skilled in the art without departing from the scope thereof as expressed in the claims. I do not wish, therefore, to be limited to the special construction I have herein shown and described; but What I do claim, and desire to secure by Letters Patent of the United States, is—

1. In a motor-truck, the combination of the engine crank-shaft, an inclosing casing, a capstan-shaft extending through the casing and having capstan-heads thereon, and boxes for supporting the capstan-shaft and casing having ball-and-socket connection with the truck-frame.

2. In a motor-truck, the combination of an engine crank-shaft, a capstan-shaft geared to and turned by the engine crank-shaft, and having capstan-heads at its ends, a compensating gearing comprising a spool-shaped shell with transmitting-pinions geared together and journaled loosely inside said shell, driving sprocket-wheels independently geared to the transmitting-pinions, a driving-pinion on the capstan-shaft, and means for shifting the driving-pinion to drive the truck at different relative speeds, and arranged to uncouple the capstan-shaft from the driving connections to permit the capstan-heads to be used when the truck is standing still.

3. In a motor-truck, the combination of a truck-platform, an engineer's cab or compartment at the forward end, an engine located beneath the truck-platform, a transverse capstan-shaft having a capstan-head at each side of the truck-platform, a change-speed gearing, and connections for operating the change-speed gearing from the driver's cab or compartment, so that the truck may be run at different relative speeds and the driving connections uncoupled permitting the capstan-heads to be used when the truck is standing still.

4. In a motor-truck, the combination of a truck-platform, a driver's cab or compartment at the forward end thereof, an engine arranged below the truck-platform, a transverse capstan-shaft geared to and turned by the engine crank-shaft, and having capstan-heads at each side of the truck, a compensating gearing comprising a spool-shaped shell with transmitting-pinions geared together and journaled loosely inside said shell, sprocket-wheels independently driven by the transmitting-pinions, a driving-pinion on the capstan-shaft, and connections for shifting the driving-pinion from the cab or engineer's compartment to couple the engine to drive the truck at different relative speeds, or to uncouple the capstan-shaft to permit the use of the capstan-heads when the truck is standing still.

5. In a motor-truck, the combination of a rear axle, a rear wheel connected rigidly to said axle, a sleeve journaled loosely at the other end of the rear axle having the other rear wheel secured thereon, a clutch for coupling said sleeve and axle so as to connect the rear wheels together, an engine or other motor, and driving connections including a compensating gearing permitting the rear wheels to turn independently when the clutch is uncoupled.

6. In a motor-truck, the combination of the engine, the capstan-shaft geared to the engine crank-shaft, and having capstan-heads at its ends, driving connections including a compensating gearing for permitting the rear wheels to turn independently, a driving-pinion, and connections for operating the same to connect the capstan-shaft to drive the truck at different relative speeds, and which can be uncoupled to permit the use of the capstan-heads while the truck is standing still, and means for coupling the driven wheels to turn together without the transmission of strains through the compensating gearing.

In testimony whereof I have hereunto set my hand in the presence of two subscribing witnesses.

RALPH L. MORGAN.

Witnesses:
  THOS. E. MORFORD,
  WM. V. LOWE.